United States Patent
Mossi et al.

(10) Patent No.: US 6,189,927 B1
(45) Date of Patent: *Feb. 20, 2001

(54) ADAPTIVE OUTPUT INFLATOR

(75) Inventors: G. Dean Mossi, Roy; Kim V. Dahl, Clinton, both of UT (US)

(73) Assignee: Autoliv ASP, Inc., Ogden, UT (US)

( * ) Notice: Under 35 U.S.C. 154(b), the term of this patent shall be extended for 0 days.

This patent is subject to a terminal disclaimer.

(21) Appl. No.: 09/465,082

(22) Filed: Dec. 16, 1999

(51) Int. Cl.$^7$ ................................................ B60R 21/26
(52) U.S. Cl. ..................... 280/741; 280/736; 280/737; 280/740; 280/742; 280/743.1
(58) Field of Search .................... 280/741, 736, 280/737, 740, 742, 743.1

(56) References Cited

U.S. PATENT DOCUMENTS

| | | | |
|---|---|---|---|
| 3,724,870 | 4/1973 | Kurokawa et al. | 280/150 |
| 4,950,458 | 8/1990 | Cunningham | 422/164 |
| 4,998,751 | 3/1991 | Paxton et al. | 280/741 |
| 5,046,429 | 9/1991 | Swann et al. | 102/530 |
| 5,346,254 | 9/1994 | Esterberg | 280/728 |
| 5,423,570 | 6/1995 | Kort et al. | 280/736 |
| 5,431,103 | 7/1995 | Hock et al. | 102/287 |
| 5,480,185 | * 1/1996 | Lowe et al. | 280/740 |
| 5,529,335 | 6/1996 | Böhmler | 280/741 |
| 5,533,751 | * 7/1996 | Kort et al. | 280/737 |
| 5,536,040 | * 7/1996 | Cuevas et al. | 280/737 |
| 5,564,743 | 10/1996 | Marchant | 280/741 |
| 5,582,427 | * 12/1996 | Rink et al. | 280/740 |
| 5,582,428 | 12/1996 | Buchanan et al. | 280/741 |
| 5,593,181 | 1/1997 | Walker et al. | 280/741 |
| 5,611,567 | 3/1997 | Hoo | 280/737 |
| 5,613,702 | 3/1997 | Goetz | 280/735 |
| 5,622,380 | 4/1997 | Khandhadia et al. | 280/736 |
| 5,624,133 | * 4/1997 | Wong | 280/740 |
| 5,628,528 | 5/1997 | DeSautelle et al. | 280/736 |
| 5,630,619 | 5/1997 | Buchanan et al. | 280/741 |
| 5,658,010 | 8/1997 | Steffens, Jr. et al. | 280/731 |
| 5,670,738 | 9/1997 | Storey et al. | 102/530 |
| 5,690,357 | 11/1997 | Cuevas | 280/737 |
| 5,695,216 | * 12/1997 | Sandstrom et al. | 280/737 |
| 5,700,030 | 12/1997 | Goetz | 280/736 |
| 5,762,368 | * 6/1998 | Faigle et al. | 280/737 |
| 5,803,494 | * 9/1998 | Headley | 280/741 |
| 5,829,785 | * 11/1998 | Jordan et al. | 280/741 |
| 5,851,027 | * 12/1998 | DiGiacomo et al. | 280/736 |
| 5,934,705 | * 8/1999 | Siddiqui et al. | 280/736 |
| 5,951,041 | 9/1999 | Iwai et al. | 280/737 |
| 6,019,389 | * 2/2000 | Burgi et al. | 280/736 |
| 6,032,979 | * 3/2000 | Mossi et al. | 280/741 |
| 6,089,598 | * 7/2000 | Snyder et al. | 280/740 |
| 6,116,641 | * 9/2000 | Scheffee | 280/736 |

\* cited by examiner

Primary Examiner—Charles T. Jordan
Assistant Examiner—Glenda L Sánchez
(74) Attorney, Agent, or Firm—Sally J. Brown (57) ABSTRACT

An airbag inflator which can supply airbag inflation gas in an adaptive output is provided. The subject inflator includes two discrete and isolated chambers of gas generant materials. At least one of the chambers includes a lid closure adapted to open to place the combustion products formed within the associated chamber in fluid communication with the contents of the other chamber. The subject inflator permits several distinct inflation performance scenarios while desirably employing a single set of inflation gas treatment components, such as filters, for the treatment of products of both chambers.

17 Claims, 6 Drawing Sheets

ADAPTIVE OUTPUT INFLATOR

CROSS REFERENCE TO RELATED APPLICATION

The subject matter of this application is related to prior U.S. patent application Ser. No. 09/027,114, filed on Feb. 18, 1999. The disclosure of the referenced related patent application is hereby incorporated by reference herein and made a part hereof, including but not limited to those portions which specifically appear hereinafter.

BACKGROUND OF THE INVENTION

This invention relates generally to inflators for use in inflating inflatable restraint airbag cushions, such as used to provide impact protection to occupants of motor vehicles. More particularly, the invention relates to inflators having multiple or plural stages or levels of inflation gas output and as such may be used to provide an inflation gas output which is adaptive to factors such as one or more crash and occupant conditions.

It is well known to protect a vehicle occupant using a cushion or bag, e.g., an "airbag," that is inflated or expanded with gas when the vehicle encounters sudden deceleration, such as in a collision. In such systems, the airbag cushion is normally housed in an uninflated and folded condition to minimize space requirements. Upon actuation of the system, the cushion begins being inflated in a matter of no more than a few milliseconds with gas produced or supplied by a device commonly referred to as an "inflator."

Various types of inflator devices have been disclosed in the art for the inflation of an airbag such as used in inflatable restraint systems. One type of known inflator device derives inflation gas from a combustible pyrotechnic gas generating material which, upon ignition, generates a quantity of gas sufficient to inflate the airbag.

Such inflator devices commonly include or incorporate various component parts including: a pressure vessel wherein the pyrotechnic gas generating material is burned; various filter or inflation medium treatment devices to properly condition the inflation medium prior to passage into the associated airbag cushion and a diffuser to assist in the proper directing of the inflation medium into the associated airbag cushion.

In view of possibly varying operating conditions and, in turn, possibly varying desired performance characteristics, there is a need and a desire to provide what has been termed an "adaptive" inflator device and a corresponding inflatable restraint system. With an adaptive inflator device, output parameters such as one or more of the quantity, supply, and rate of supply of inflation gas, for example, can be selectively and appropriately varied dependent on selected operating conditions such as ambient temperature, occupant presence, seat belt usage and rate of deceleration of the motor vehicle, for example.

While such adaptive systems are desirable, they typically require the inclusion of additional components as a part of the associated inflator device and such as may undesirably increase one or more of the size, cost and weight of the inflator device. For example, various proposed or currently available dual stage inflator devices appear based on the principal of packaging together two separate inflators. As a result, such inflator combinations commonly include two distinct pressure vessels, two sets of filter or inflation gas treatment components, one for the output of each of the pressure vessels, and two distinct diffusers, again one for the output of each of the pressure vessels. Thus, it has been difficult to provide an adaptive inflator which will satisfactorily meet the size, cost and weight limitations associated with modern vehicle design, particularly as it pertains to driver side applications.

More specifically, driver side airbag inflator devices commonly have the general form of a flattened, disk-shaped circular cylinder typically or generally having a length (sometimes referred to as "height") to diameter ratio of about 0.5 or less. For example, a typical driver side inflator might be about 40 mm in length or height and about 80 mm in diameter. An inflator device having such shape and size provides a familiar and convenient package for insertion in a corresponding or associated airbag module housing.

Thus, there is a need for an adaptive inflator device of simple design and construction and which will meet the size requirements for vehicles, especially for driver side applications. In particular, the growing use or desire to use adaptive output inflators has made it generally desirable for the shape of adaptive output inflators to not significantly depart from the typical design envelope associated with prior single stage inflators and to thereby preferably facilitate the incorporation of such adaptive output inflator devices into various vehicle designs and to minimize or avoid significant design changes to the mating hardware included with particular airbag modules.

At least partially in response to such need, a new type of adaptive inflator device, the subject of the above-identified patent application, U.S. patent application Ser. No. 09/027,114, has been developed. In accordance with one embodiment disclosed therein, such an airbag inflator device includes a housing defining a first chamber which in an at rest or static state or condition contains a quantity of a first gas generant material ignitable to produce first combustion products including a first inflation gas. The first chamber has a plurality of spaced apart gas exit ports adapted to open to permit passage of the first inflation gas from the airbag inflator. The first chamber also contains a second chamber which in an at rest or static state or condition contains a quantity of a second gas generant material ignitable to produce second combustion products. The second chamber includes an exit orifice adapted to open to place the second combustion products in fluid communication with the contents of the first chamber. The airbag inflator also includes a first igniter device operatively associated with the first chamber and a second igniter device operatively associated with the second chamber.

While such an inflator device can be generally effective in overcoming at least some of the shortcomings of prior art inflator devices, a further improved adaptive inflator device may be desired for use in at least certain specific applications. For example, if a traditional cylindrical driver side airbag inflator shape is used for an adaptive output inflator, such as includes two or more separate pyrotechnic charges, special design restrictions may need to be imposed on the internal arrangement of the inflator in order to properly maintain desired separation of such distinct pyrotechnic charges. As will be appreciated, such charge separation restrictions are generally not needed or included in typical single stage inflator devices.

Typically, the most significant inflator design and operational requirement resulting from a desire to properly maintain separation of distinct pyrotechnic charges is evidenced through design features included to maintain either and, preferably, both, a pressure and a thermal boundary between the respective pyrotechnic charges until such time that the particular charge is desired to be ignited. The most usual instance of such desired separation is in the case of a two-stage inflator having a first chamber which contains or includes a first pyrotechnic charge and a second chamber which contains or includes a second pyrotechnic charge. In practice, the maintenance of such charge separation necessitates that the second pyrotechnic charge be isolated from the combustion products resulting from the combustion of the first pyrotechnic charge. For example, the second pyrotechnic charge is desirably isolated from the product gases resulting from the combustion of the first pyrotechnic charge such that such combustion product gases cannot enter into the chamber housing the second pyrotechnic charge and result in the ignition thereof.

Conversely, when it is desired that the second stage pyrotechnic charge be ignited, the inflator design and operation desirably will permit the inflation gas resulting from the combustion of the second pyrotechnic charge to flow into the first chamber and ultimately exit from the inflator, such to facilitate inflator design and the efficient operation thereof.

In an effort to address the need for such charge isolation, at least certain designs make use of what is known as a burst disk. Typically, burst disks are made of relatively thin metal and are designed and selected to rupture or otherwise open when a sufficient predesigned pressure is applied thereagainst. While such applications of burst disks are generally effective in maintaining desired pressure boundaries between respective pyrotechnic charges of at least certain multiple charge-containing inflator devices, such burst disk uses are generally not fully effective in maintaining required or desired temperature boundaries between respective pyrotechnic charges. In particular, such burst disks are typically relatively thin and do not provide sufficient desired thermal isolation between adjacent charges. Further, such uses or applications of burst disk components generally necessitate the inclusion of certain additional supporting components such as one or more support plates. As will be appreciated, the inclusion of such additional component or the like can undesirably complicate manufacture, production, and operation of the resulting device as well as undesirably increase either or both the weight or cost associated with such devices. Alternatively or in addition, burst disks are commonly welded in place. Such weld processing can undesirably add to the time and expense of production and may additionally raise the potential for leakage therethrough, such as may hinder or defeat desired operation.

Thus, there is a need and a demand for an adaptive inflator device and operation which will facilitate such charge isolation until the desired actuation thereof and thereupon cooperate or function to permit the desired flow of the combustion products resulting from the combustion of the second pyrotechnic charge into the first chamber and ultimately to exit from the inflator. Further, there is a need and a demand for such an adaptive inflator device of relatively simple design and construction and, in turn, comparatively, low or reduced cost. In particular, there is a need and a demand for such an adaptive inflator device which will meet the size requirements for vehicles, especially for driver side applications.

SUMMARY OF THE INVENTION

A general object of the invention is to provide an improved inflator and associated or corresponding methods of operation.

A more specific objective of the invention is to overcome one or more of the problems described above.

The general object of the invention can be attained, at least in part, through an airbag inflator which includes a housing that defines a first chamber which in an at rest state contains a quantity of a first gas generant material ignitable to produce first combustion products. The first chamber also contains a second chamber which in an at rest state contains a quantity of a second gas generant material ignitable to produce second combustion products. The second chamber includes an exit orifice adapted to open to place the second combustion products in fluid communication with the contents of the first chamber. The airbag inflator also includes a first igniter device operatively associated with the first chamber and a second igniter device operatively associated with the second chamber.

In accordance with another embodiment, the invention comprehends an airbag inflator which includes a housing which defines a first chamber. The first chamber, in a static state, contains a quantity of a first gas generant material ignitable to produce first combustion products including a first inflation gas. The first chamber also contains a second chamber. The second chamber, in a static state, is closed and contains a quantity of a second gas generant material ignitable to produce second combustion products. The inflator further includes a first igniter device operatively associated with the first chamber and a second igniter device operatively associated with the second chamber. In accordance with a preferred embodiment of the invention, the second chamber includes a lid closure adapted to open to place the second combustion products in fluid communication with the contents of the first chamber.

In a further specific embodiment, the second chamber includes a cup-shaped base having a shoulder portion with which, in the static state, the lid closure forms a press fit seated engagement whereby passage of the first combustion products into the second chamber is prevented.

In yet another specific embodiment, the lid closure is adapted to open upon application thereagainst of a predetermined pressure from within the second chamber.

In yet still another specific embodiment, upon application of the predetermined pressure from within the second chamber against the lid closure, the lid is unseated from the shoulder portion forming a clearance space between the lid closure and the shoulder portion, whereby at least a portion of the second combustion products are placed in fluid communication with the contents of the first chamber outside of the second chamber.

The prior art generally fails to provide an adaptive inflator device and corresponding operation which provide as effective as desired isolation of two separate or distinct charges of ignitable gas generant material, e.g., pyrotechnic, until the respective desired actuation thereof and which thereupon desirably cooperate or function to permit the desired flow of the combustion products resulting from the combustion of the charge of each chamber into communication with the contents of the other chamber and ultimately to exit from the inflator. Further, the prior art generally fails to provide an adaptive inflator device having as simple as desired design or construction and which, in turn, is as inexpensive as desired to make, operate or use. In particular, the prior art generally fails to provide such an adaptive inflator device which will meet the size requirements for vehicles, especially for driver side applications.

The invention still further comprehends a method of generating inflation gas. In a particular embodiment, such method of inflation gas generation is via an airbag inflator which includes a housing that defines a first chamber. The first chamber, in a static state, contains a quantity of a first gas generant material ignitable to produce first combustion products including a first inflation gas. The first chamber has a plurality of spaced apart gas exit ports adapted to open to permit passage of the first inflation gas from the airbag inflator.

The first chamber also contains a second chamber. The second chamber, in a static state, is closed and contains a quantity of a second gas generant material ignitable to produce second combustion products including a second inflation gas. The second chamber includes a lid closure adapted to open to place the second combustion products in fluid communication with the contents of the first chamber.

The inflator further includes a first igniter device operatively associated with the first chamber and a second igniter device operatively associated with the second chamber.

In accordance with one preferred embodiment of the invention, such a method of inflation gas generation involves the step of actuating at least one of the first and second igniter devices.

As used herein, references to the detection or sensing of "occupant presence" are to be understood to refer to and include detection and sensing of size, weight, and/or positions of the particular occupant under consideration.

References to inflator or inflation gas "output" are to be understood to refer to inflator performance output parameters such as the quantity, supply, and rate of supply of inflation gas. With "adaptive output inflators," the inflator output is generally dependent on selected operating conditions such as ambient temperature, occupant presence, seat belt usage and rate of deceleration of the motor vehicle, for example.

Other objects and advantages will be apparent to those skilled in the art from the following detailed description taken in conjunction with the appended claims and drawings.

BRIEF DESCRIPTION OF THE DRAWINGS

FIGS. 7–10 are simplified schematic cross sectional views of the airbag inflator of FIGS. 4 and 5 at selected points in time subsequent to actuation in accordance with one embodiment of the invention. More specifically.

DETAILED DESCRIPTION OF THE INVENTION

Figure 1:
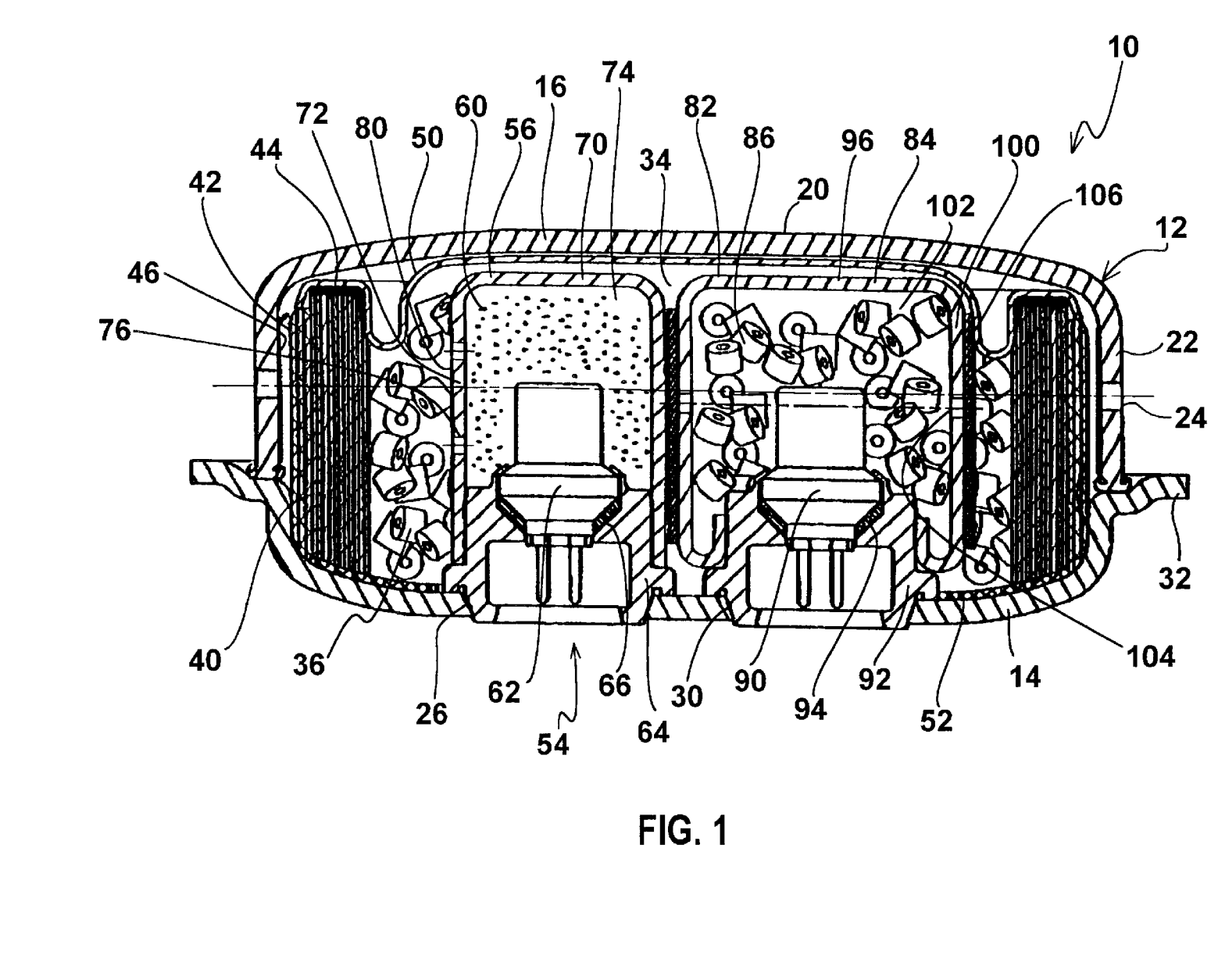
FIG. 1 is a partial cross-sectional side view of an airbag inflator in accordance with one embodiment of the invention.
Figure 2:
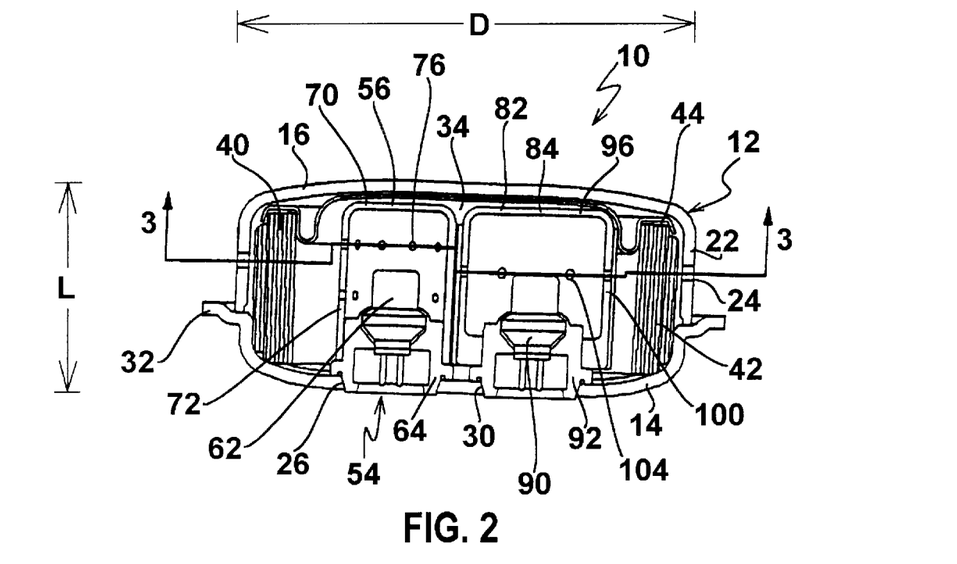
FIG. 2 is a partial cross-sectional side view of the airbag inflator of FIG. 1 but now simplified by not showing gas generant, igniter materials and certain seals, for example.
Figure 3:
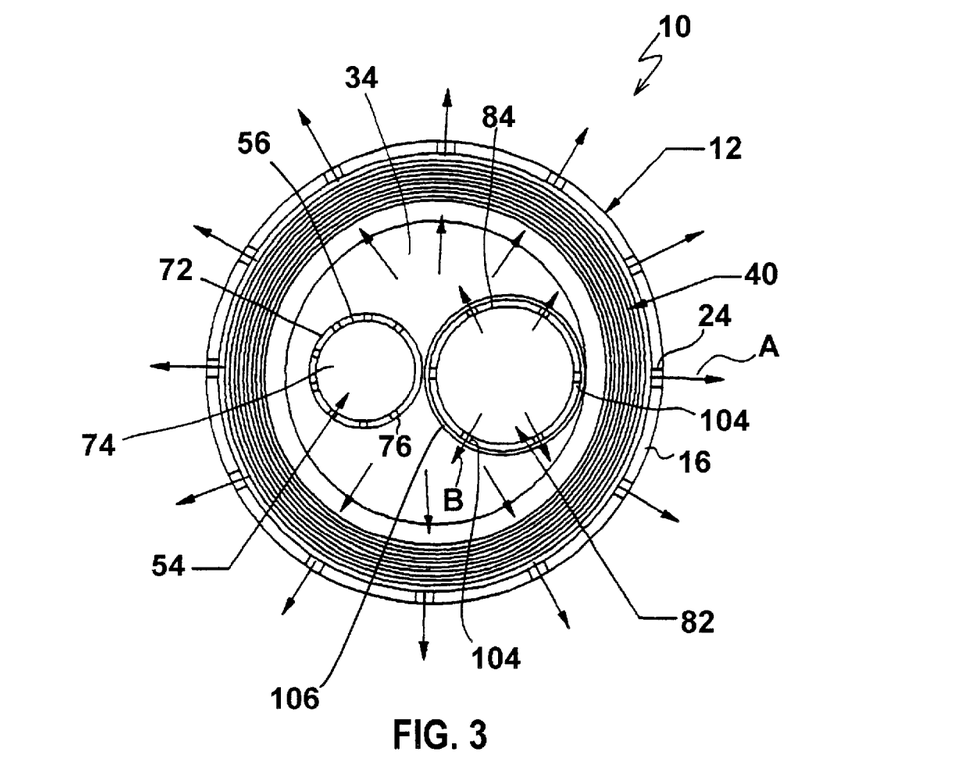
FIG. 3 is a view of the airbag inflator illustrated in FIG. 2 taken substantially along the line 3—3 of FIG. 2 and viewed in the direction of the arrows.

FIGS. 1–3 illustrate an adaptive output driver side inflator assembly in accordance with a one embodiment of the invention and generally designated with the reference numeral 10. While the invention will be described hereinafter with particular reference to a driver side airbag inflatable restraint system installation, it will be understood that the invention has general applicability to other types or kinds of airbag assemblies including, for example, passenger side, and side impact airbag assemblies such as for automotive vehicles including vans, pick-up trucks, and particularly automobiles.

The inflator assembly 10 has a generally cylindrical external outline and includes a housing construction 12 such as formed of two structural components, i.e., a lower shell or base portion 14 and an upper shell or diffuser cap portion 16, such as may desirably be made of aluminum and appropriately joined or fastened together such as by application of an appropriate welding operation. The housing 12 is illustrated in the general form of a flattened, disk-shaped circular cylinder typically or generally having a length (denominated "L") to diameter (denominated "D") ratio of about 0.5 or less. It will be appreciated that such a sized and shaped housing may most conveniently correspond to the shape of the vehicle steering wheel and can therefore facilitate assembly in an aesthetically pleasing manner.

The diffuser cap portion 16 is in the general form of an inverted bowl and includes a top wall 20 and a cylindrical sidewall 22. The sidewall 22 includes a plurality of spaced, preferably, generally uniformly spaced gas exit ports 24.

The base portion 14 includes first and second mounting openings, designated by the reference numerals 26 and 30, respectively, the use of which will be discussed in greater detail below. The base portion 14 also includes a peripheral bracket 32 that extends radially outward from the housing 12 and serves to form an interface attachment which is used to attach the inflator assembly 10 to a vehicle the occupants of which are to be protected from injury tending to result from the impact of a collision.

The housing 12 is configured to define a central, generally cylindrical first chamber 34. The first chamber 34 contains or houses a supply of a first gas generant material 36, typically in the form of a pyrotechnic, such as known for use in airbag inflators, such as composed of a transition metal ammine nitrate with oxidizer and binder, for example. Surrounding the first gas generant material 36 is a filter assembly 40 such as includes a combustion screen or filter 42 such as formed of multiple layers or wraps of a metal screen and a filter damper pad 44. Surrounding the filter 42 and generally adjacent the inner surface of the sidewall 22 is an adhesive-backed foil seal 46 which preferably hermetically seals the gas generant material 36 within the inflator 10, thereby protecting the gas generant material from ambient conditions, such as including moisture. The inflator assembly 10 also includes a retainer 50 and an annular base damper pad 52 serving as construction expedients retaining the inflator assembly components in proper relative arrangement and preventing undesired flow passage through the assembly.

A first igniter assembly, generally designated by the reference numeral 54, is mounted to the housing 12 in a location within the first chamber 34 via the first mounting opening 26. The first igniter assembly 54 may take the form of a known pyrotechnic initiator device such as includes, as are known in the art, an igniter cup 56 wherein is housed an igniter material 60, a first igniter device or squib 62, a squib adapter or holder 64 whereby the igniter assembly 54 is mounted to or is mated with the housing 12 and a squib seal 66, sealing the squib 62 with the adapter 64. As shown, the igniter cup 56 can take the form of a generally concave member with a cap 70 and a cylindrical sidewall 72 forming an interior 74. The igniter cup 56 can be formed of a gas-impermeable material, such as metal, with the cylindrical sidewall 72 including a plurality of spaced, preferably, generally uniformly spaced gas exit orifices 76. The gas exit orifices 76 are normally (e.g., when the inflator is in a static or prior to actuation state) covered and the passage of material therethrough prevented by means of a pressure sensitive covering or barrier 80, such as by means of an adhesive-backed foil seal wrap or the like as is well known in the art. As is known, the covering 80 can be selected to open or rupture upon the application of a predetermined pressure thereagainst from the interior of the igniter cup 56.

When actuated, ignition of the igniter material 60 customarily results in an increase in pressure within the cup interior 74 with the subsequent predetermined rupturing or opening of the covering 80 to permit passage of ignition products produced by the combustion of the igniter material 60 through the exit orifices 76, from the igniter assembly 54 to the gas generant material 36 contained within the first chamber 34. The resulting contact by or between the ignition products and the gas generant material results in the ignition and reaction of the gas generant material, with gases so produced passing through the filter 42, rupturing the foil seal 46 and passing through the gas exit ports 24 (as signified by the arrows A) and out from the inflator assembly 10 into an associated airbag cushion (not shown). As will be appreciated, the contact of ignition products with the gas generant material can appropriately be, either or both, thermal or physical in nature.

In practice, the igniter assembly 54 can be formed by placing the igniter cup 56 containing the igniter material 60 over the igniter device 62 and the holder 64 and placed at the mounting opening 26. The igniter assembly 54 may then be joined to the housing 12 such as by welding the holder 64 to the base portion 14 at the mounting opening 26.

The first chamber 34 also houses or contains a second chamber 82. The second chamber 82 includes a generant cup 84 wherein is housed a gas generant material, herein designated as the second gas generant material 86, a second igniter device or squib 90, a second squib adapter 92 whereby the second chamber 82 is mounted to or mates with the housing 12 and a second squib seal 94, sealing the squib 90 with the adapter 92. As shown, the generant cup 84 can take the form of a generally concave member with a cap 96 and a cylindrical sidewall 100 forming an interior 102.

The second gas generant material 86 is typically in the form of a pyrotechnic material and may be either the same or different in composition, shape, size or form, as compared to the first gas generant material 36. The generant cup 84 can be formed of a gas-impermeable material, such as metal, with the cylindrical sidewall 100 including a plurality of spaced, preferably, generally uniformly spaced gas exit orifices 104.

The exterior side of the cylindrical sidewall 100 is covered or wrap with a pressure sensitive insulator barrier material 106. Desirably, such an insulator barrier material 106 can serve one or more of several functions. First, the insulator barrier material 106 can serve to insulate the second chamber 82 and the contents thereof, e.g., the second gas generant material 86, from at least some of the effects of actuation of the first igniter assembly 54 and combustion of the first gas generant material 36 contained within the first chamber 34. As will be appreciated, actuation of the first igniter assembly 54 and reaction of the first gas generant material 36 will generally result in or produce an increase in temperature.

As described above, the second chamber 82 is housed or contained within the first chamber 34 and, in order to minimize space requirements, it is generally preferable that the second chamber 82 be in close proximity with the igniter assembly 54. Thus, the inclusion of the insulator barrier material 106 can serve to minimize or avoid the undesired and possibly detrimental impact of such temperature increase with respect to the second chamber 82 such as by preventing or avoiding the second chamber 82 from reaching or achieving the autoignition temperature of the gas generant material stored or housed therewithin as a result of contact with the reaction products of the first chamber 34.

Further, the insulator barrier material 106 can serve to normally (e.g., when the inflator 10 is in a static or prior to actuation state) cover the gas exit orifices 104 and prevent the passage of material therethrough. The insulator barrier material 106 will generally be selected to open or rupture upon the application of a predetermined pressure thereagainst from the inside of the second chamber 82.

As will be appreciated, the insulator barrier material can take various forms such as fiberglass-containing adhesive-backed foil tape. Further, it will be appreciated that if desired separate materials can be used to fulfill, supply or provide the various functions of such an insulator barrier material. For example, the invention can be practiced with an insulator barrier material composed of one or more materials for insulating properties or benefits and an additional one or more materials to effect normal closure or coverage of the gas exit orifices.

It will be appreciated that an inflator assembly in accordance with the invention can provide operation performance in accordance with selected operating conditions as may be required or desired for particular inflatable restraint system installations and applications. More specifically, an inflator assembly of the invention can be actuated in a manner such that either or both the quantity or rate of inflation gas production can be appropriately varied, such as at the time of a vehicle crash or collision incident, to take into account one or more conditions of occupant presence, as described above. Such inflator performance adaptability results from the subject inflator having two discrete and ballistically isolated chambers of gas generant materials. The subject inflator permits several distinct inflation performance scenarios:

For example, such an inflator assembly can be operated to have a first stage discharge whereby the first igniter charge 60 is ignited to produce combustion products which are passed to the first gas generant chamber 34 to ignite the first gas generant material 36, such as described above, to produce inflation gas at a first output level without actuating or firing the second igniter device 90 or reacting or activating the gas generant material 86 contained in the second chamber 82. As will be appreciated, such operation may be desired to provide a minimized or reduced inflator output such as may be desired in an instance of a low speed collision, for example.

Alternatively, an inflator assembly in accordance with the invention can be operated such that both the first and second igniter devices, 62 and 90, respectively, are actuated.

As will be appreciated, such operation and ignition of both the first and second igniter devices and first and second gas generant materials can involve the simultaneous or near simultaneous actuation and firing of the first and second igniter devices (such as may be desired in order to provide a very rapid inflation and deployment of an associated airbag cushion, as may be desired in response to a high speed or severe vehicle collision) or the sequential actuation and firing of the first and second igniter devices (such as may be desired upon the occurrence of a moderately severe vehicle collision). Further, with such sequential actuation and firing, the time lag or delay between the actuation and firing of the first and second squibs and, in turn, the ignition of the first and second gas generant materials can be tailored to meet the specific requirements for a particular inflatable restraint system installation, as will be appreciated by those skilled in the art. Thus, such inflator assemblies are particularly suited for application as adaptive output inflators such as can be made generally dependent on one or more selected operating conditions such as ambient temperature, occupant presence, seat belt usage and rate of deceleration of the motor vehicle, for example.

With actuation of the igniter device 90, the igniter device 90 releases ignition products which ignite the gas generant 86 to produce reaction products which result in an increase in pressure within the cup interior 102 with the subsequent predetermined rupturing or opening of the insulator barrier material 106 to permit passage of the reaction products through the exit orifices 104 (as signified by the arrows B) and subsequently out through the gas exit ports 24 from the inflator assembly 10 into the associated airbag cushion (not shown).

The inflator assembly 10, rather than relying on separate filter assemblies for each chamber or stage of the inflator, as is common with various prior art dual stage inflator devices, employs or utilizes a single filter assembly 40 for the filtration or treatment, e.g., cooling, of the inflation products produces from both the first and second chambers. Further, such use of a single filter assembly rather the use of two or more filter assemblies can serve to reduce or eliminate the need for the inclusion of multiple filter assembly seals. Still further, the inflator assembly 10 includes a single diffuser rather than requiring separate diffusers for each chamber or stage contained therein.

As will be appreciated, reductions in the number of parts in an inflator assembly can simplify inflator design, reduce manufacturing and production costs, reduce assembly weight and result in an assembly requiring a smaller volume of space within a vehicle. For example, the use of a single filter or filter assembly for the filtration of the inflation products of the inflation discharge of both the first and second chambers can simplify system design and result in better utilization of space within the inflator assembly. Thus, facilitating the design of an adaptive inflator assembly to be generally housed within the envelope typically or usually sized and provided for system installations, particularly for a driver side inflatable restraint systems, such as sized to be housed within or at a steering wheel column or hub.

The invention in its broader application is not limited to the use of a particular or specific gas generant. As those skilled in the art will appreciate, the invention can be practiced using a wide variety of gas generant materials which meet flame temperature, stability, filterability, toxicity, corrosivity, and gas generation requirements. The invention is believed to be particularly suited for practice in conjunction with the use of pyrotechnic gas generant materials, as are known in the art including, for example, a pyrotechnic composed of a transition metal ammine nitrate with oxidizer and binder, as is known in the art.

As will be appreciated, gas generant materials, e.g., pyrotechnics, useful in the practice of the invention can take various appropriate desired forms, including, for example, various extruded forms as well as granulated materials. The invention, in its broader practice, is not limited to particular or specific forms of gas generant materials.

Further, it is to be appreciated that while an inflator assembly in accordance with the invention may utilize a gas generant material of the same composition and physical form or parameters as both the first and second gas generant materials, the broader practice of the invention is not so limited. For example, it specifically may be desired that the first gas generant material be relatively slow burning so as to result in or provide a slower or gentler onset of inflation of the associated airbag cushion and that the second gas generant material be relatively quick burning to provide a quicker or faster inflation rate for the associated airbag and such as may be desired in the occurrence of the associated vehicle being involved in a relatively severe collision or crash. Such difference in performance can be realized through the use of gas generant materials of different composition as the first and second gas generant materials. Alternatively or additionally, the first and second gas generant materials can be in different physical form or have different physical parameters, e.g., shape and size. For example, to provide a faster or more rapid burning material it may be desirable to employ a form of the material having an increased or greater surface area.

As will be appreciated and as described in the above-identified patent application, U.S. patent application Ser. No. 09/027,114, both the rise rate and maximum pressure realized by the firing of the one or both of the chambers of the inflator can be selected or varied such as by appropriately altering the amount, size, shape and type of pyrotechnic material contained in the fired chamber(s) as well by selectively altering other design parameters. Further, the pressure versus time performance for the inflator can be tuned to the requirements or needs for a particular airbag system installation to appropriately reduce occupant injury and optimize occupant protection.

Figure 4:
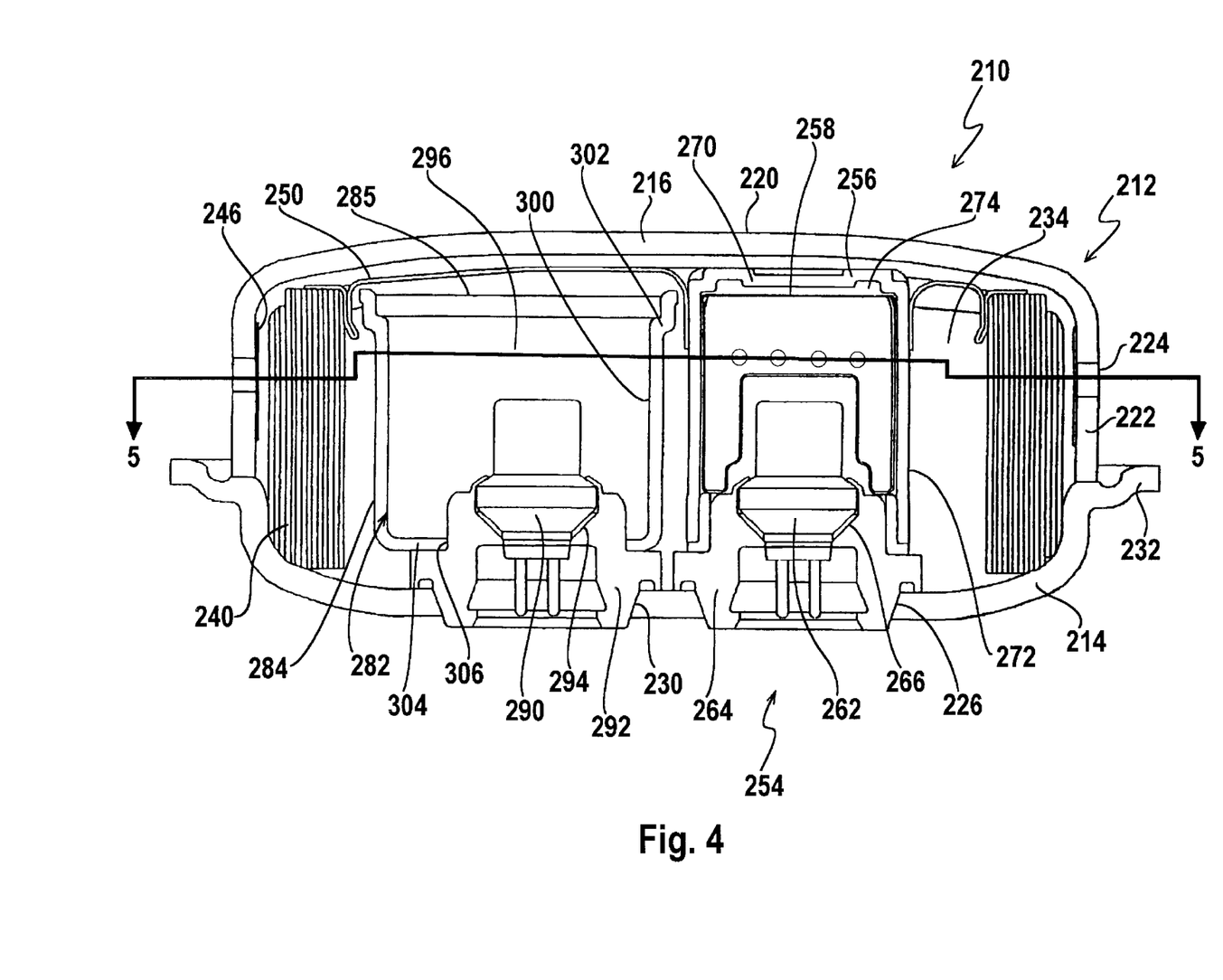
FIG. 4 is a partial cross-sectional side view of an airbag inflator, in accordance with an alternative embodiment of the invention, while in a static state or condition and simplified in a manner similar to FIG. 2.
Figure 5:
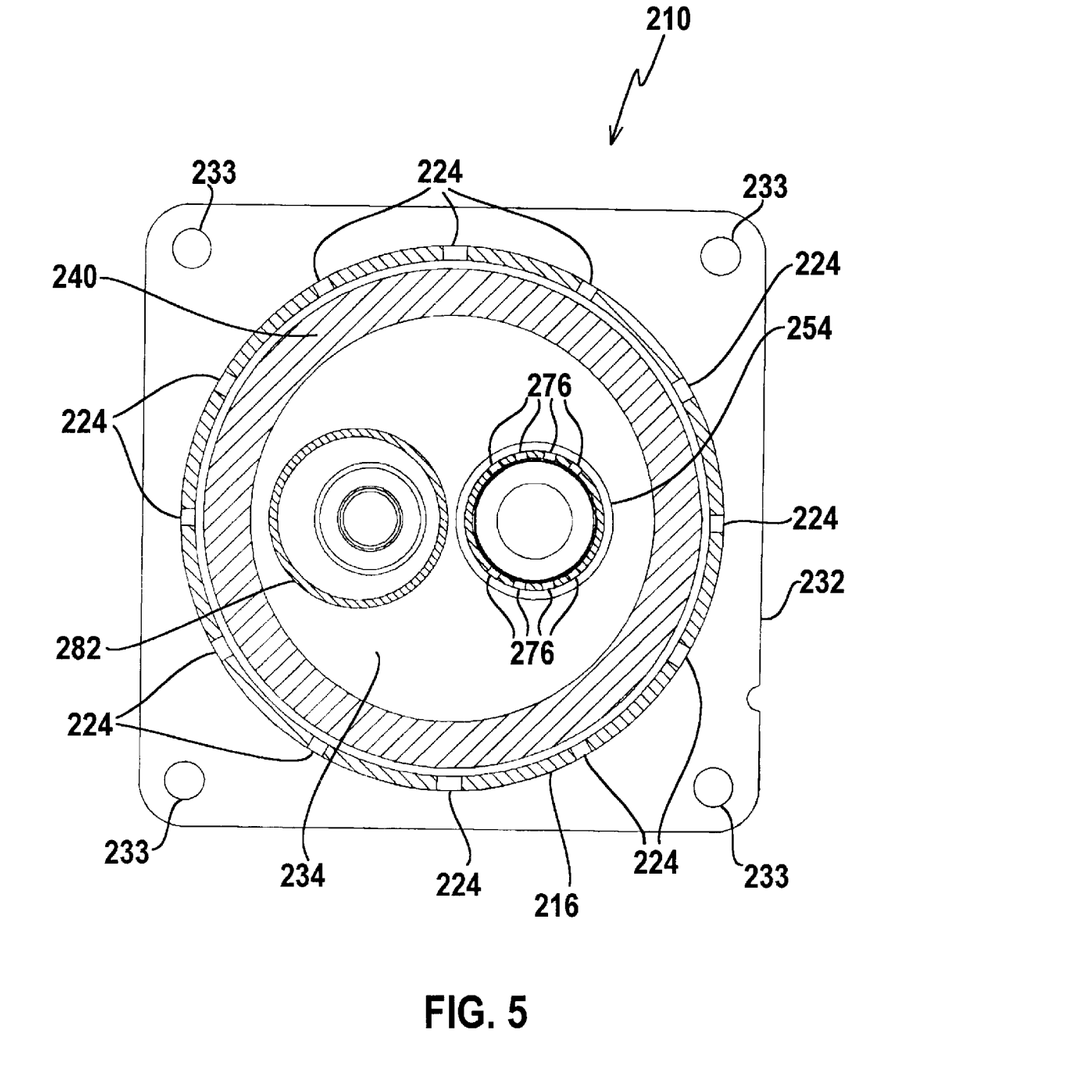
FIG. 5 is a view of the airbag inflator illustrated in FIG. 4 taken substantially along the line 5—5 of FIG. 4 and viewed in the direction of the arrows.

Turning now to FIGS. 4 and 5, there is illustrated an adaptive output driver side inflator assembly, generally designated with the reference numeral 210, in accordance with another preferred one embodiment of the invention. In particular, FIGS. 4 and 5 illustrate the inflator assembly 210 while in a static state or condition, e.g., prior to actuation, and simplified in a manner similar to FIG. 2.

The inflator assembly 210 is similar to the inflator assembly 10 described above in that, for example, it includes a housing construction 212 having a generally cylindrical external outline and such as formed of two structural components, i.e., a lower shell or base portion 214 and an upper shell or diffuser cap portion 216, such as may desirably be made of aluminum and appropriately joined or fastened together such as by application of an appropriate welding operation. The housing 212 is illustrated in the similar general form of a flattened, disk-shaped circular cylinder typically or generally having a length to diameter ratio of about 0.5 or less and such as sized and shaped to conveniently correspond to the shape of the vehicle steering wheel and therefore facilitate assembly in an aesthetically pleasing manner.

Similar to the diffuser cap portion 16, in the above-described inflator assembly 10, the diffuser cap portion 216 is in the general form of an inverted bowl and includes a top wall 220 and a cylindrical sidewall 222, which includes a plurality of spaced, preferably, generally uniformly spaced gas exit ports 224.

The base portion 214 includes first and second mounting openings, designated by the reference numerals 226 and 230, respectively. The base portion 214 also includes a peripheral bracket 232 that extends radially outward from the housing 212 and serves to form an interface attachment which is used to attach the inflator assembly 210 to a vehicle the occupants of which are to be protected from injury tending to result from the impact of a collision. As shown in FIG. 5, the attachment bracket 232 is generally square or rectangular in outline and includes a selected number of attachment openings 233 for passage of a selected fastener (not shown), e.g., a rivet or bolt, to permit the attachment or joinder of the inflator assembly 210 with a corresponding portion of the vehicle. As will be appreciated, attachment brackets used in the practice of the invention can be variously shaped and sized dependent upon the particulars of the specific installation application.

The housing 212 is configured to define a central first chamber 234. The first chamber 234 contains or houses a supply of a first gas generant material, such as typically in the form of a pyrotechnic as described above and not here shown to facilitate illustration and comprehension. Within the first chamber 234, such as in surrounding relation with the first gas generant material therein contained, is a filter assembly 240. Such a filter assembly may, as described above relative to the inflator assembly 10, include a combustion screen or filter such as formed of multiple layers or wraps of a metal screen and a filter damper pad or the like.

As with the inflator assembly 10, the inflator assembly 210 includes, surrounding the filter assembly 240 and generally adjacent the inner surface of the sidewall 222, an adhesive-backed foil seal 246 such as preferably hermetically seals the gas generant material within the inflator 210, thereby protecting the gas generant material from ambient conditions, such as including moisture. The inflator assembly 210 also similarly includes a retainer 250 such as may serve as a construction expedient to retain the inflator assembly components in proper relative arrangement and prevent undesired flow passage through the assembly.

A first igniter assembly, generally designated by the reference numeral 254, is mounted to the housing 212 in a location within the first chamber 234 via the first mounting opening 226. The first igniter assembly 254 may take the form of a known pyrotechnic initiator device such as includes, as is known in the art, an igniter cup 256 wherein is housed a canister 258, such as contains an igniter material as described above and not here shown to facilitate illustration and comprehension. The first igniter assembly also includes a first igniter device or squib 262, a squib adapter or holder 264 whereby the igniter assembly 254 is mounted to or mated with the housing 212 and a squib seal 266, sealing the squib 262 with the adapter 264. As shown, the igniter cup 256 can take the form of a generally concave member with a cap 270 and a cylindrical sidewall 272 forming an interior 274. The igniter cup 256 can be formed of a gas-impermeable material, such as metal, with the cylindrical sidewall 272 including a plurality of positioned and spaced gas exit orifices 276 (shown in FIG. 5). The gas exit orifices 276 are normally (e.g., when the inflator is in a static or prior to actuation state) covered and the passage of material therethrough prevented by means of a pressure sensitive covering or barrier (not shown), such as by means of an adhesive-backed foil seal wrap or the like as is well known in the art. As is known, such covering can be selected to open or rupture upon the application of a predetermined pressure thereagainst from the interior of the igniter cup 256.

When actuated, the squib 262 discharges or otherwise results in the rupture or opening of the ignition material canister 258. In turn, ignition of the igniter material normally contained therein customarily results in an increase in pressure within the cup interior 274. As will be appreciated and such as in a manner as known in the art, the covering of the gas exit orifices 276 will rupture, open or otherwise permit passage of ignition products, produced by the combustion of the igniter material, through the underlying gas exit orifices 276 and thus into contact with the gas generant material contained within the first chamber 234. The resulting contact by or between the ignition products and the gas generant material results in the ignition and reaction of the gas generant material, with the gases produced by such reaction passing through the filter assembly 240, rupturing the foil seal 246 and passing through the gas exit ports 224 and out from the inflator assembly 210 into an associated airbag cushion (not shown). As will be appreciated, the contact of ignition products with the gas generant material can appropriately be, either or both, thermal or physical in nature.

In practice, the igniter assembly 254 can be formed by placing the ignition material canister 258, containing the igniter material, in the igniter cup 256. Then, the igniter cup 256 can be placed over the igniter device 262 and the holder 264 and placed at the mounting opening 226. The igniter assembly 254 may then be joined to the housing 212 such as by welding the holder 264 to the base portion 214 at the mounting opening 226.

The first chamber 234 also houses or contains a second chamber 282. It is with respect to this second chamber and the construction and operation thereof that the inflator assembly 210 differs most significantly from the inflator assembly 10 described above. The second chamber 282 includes a generant cup 284, a lid closure 285, a second igniter device or squib 290, a second squib adapter 292 whereby the second chamber 282 is mounted to or mates with the housing 212 and a second squib seal 294, sealing the squib 290 with the adapter 292.

The generant cup 284 and the lid closure 285 cooperate to form a generant cup interior 296 wherein is desirably placed a selected quantity of a second gas generant material such as typically in the form of a pyrotechnic as described above and not here shown to facilitate illustration and comprehension. As described above, the second gas generant material may typically be in the form of a pyrotechnic material and may be either the same or different in composition, shape, size or form, as compared to the first gas generant material.

The generant cup 284 desirably includes a generally cylindrical sidewall 300 and such as preferably includes a shoulder portion 302 such as formed therein. The lid closure 285 and the shoulder portion 302 may desirably form a press or interference fit form of attachment when in a static state or condition. The generant cup 284 also includes a base portion 304 such as integrally formed in one piece with the generally cylindrical sidewall 300. The base portion 304 includes an opening 306 wherethrough the second squib adapter 292 may be passed and joined, such as in a manner known in the art.

The generant cup 284 and the lid closure 285 can each selectively be formed of a gas-impermeable material, such as metal, such as A715 steel, for example. In accordance with a preferred practice of the invention, the generant cup 284 and the lid closure 285 cooperate and function in a manner such as to prevent the combustion products resulting upon actuation of the first igniter device 262, to enter into the second chamber 282. For example and as shown, the lid closure 285 may desirably form a press fit seated engagement with the shoulder portion 302 such as to prevent passage of the combustion products resulting upon actuation of the first igniter device 262 into the second chamber 282. As will be appreciated, the passage of such combustion products into the second chamber could otherwise result in the undesired ignition and reaction of the gas generant material housed or contained within the second chamber 282. Further, the generant cup 284 and the lid closure 285 desirably cooperate and function in a manner such as to permit the combustion products formed by reaction of the gas generant material contained within the second chamber 282, when properly and desirably actuated, to pass from the second chamber 282 out into the first chamber 234 and subsequently through the filter assembly 240 and the exit ports 224 out from the inflator assembly 210 and into an associated airbag cushion (not shown).

Figure 6:
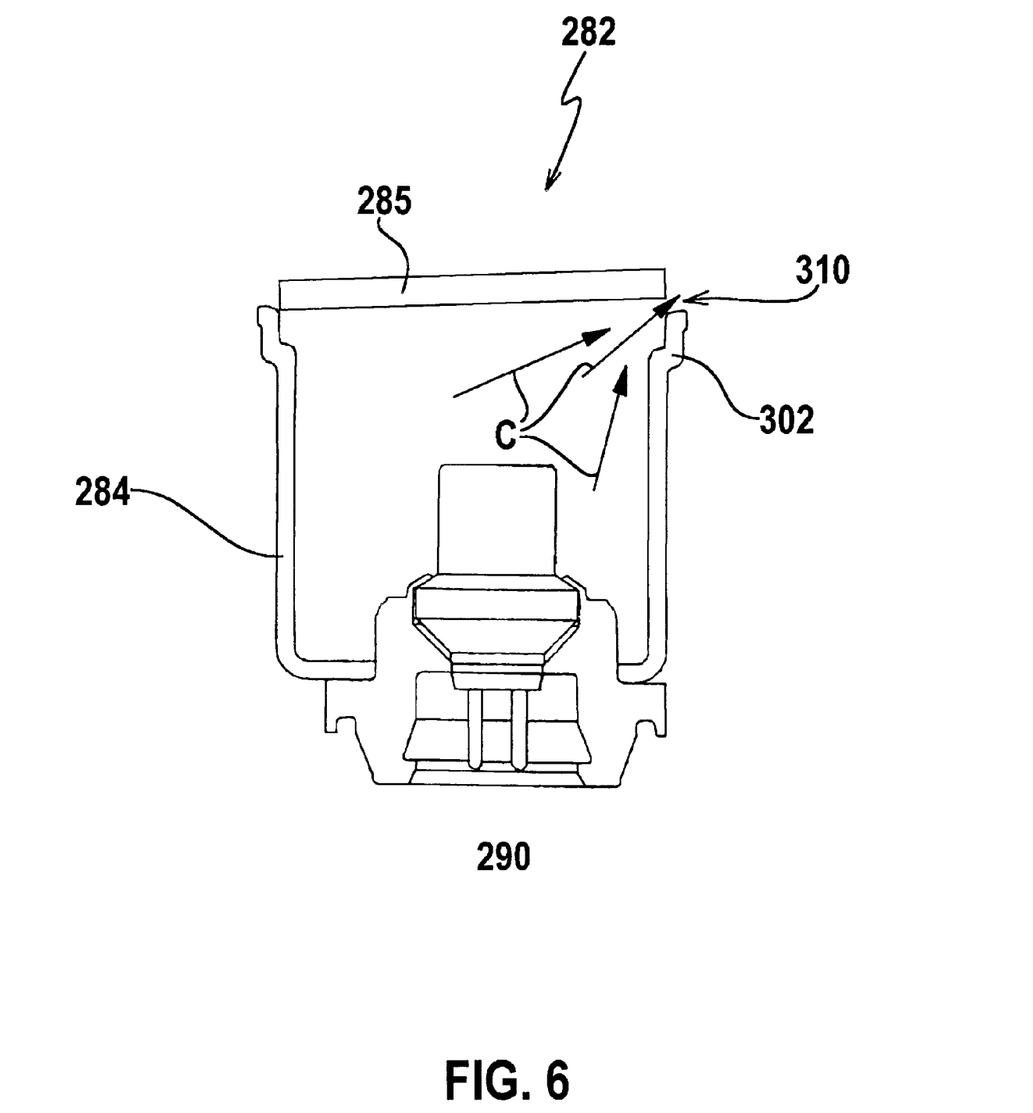
FIG. 6 is a partial cross-sectional side view of the second chamber combination 282, shown in FIGS. 4 and 5, in isolation but now in a condition permitting fluid communication of the contents therefrom.

FIG. 6 illustrates the second chamber combination 282 in isolation but now in a condition permitting fluid communication of the contents therefrom, and such as into the first chamber 234 shown in FIGS. 4 and 5. More specifically, actuation of the igniter device 290 results in combustion of the gas generant material contained or housed within the second chamber 282. When the pressure within the second chamber 282 reaches a predetermined level, however, such internal pressure acts or serves to pop-off or otherwise dislodge the lid closure 285 from the sidewall shoulder portion 302. As a result, a clearance space, generally designated by the reference numeral 310, is formed between the dislodged lid closure 285 and the shoulder portion 302. This clearance space 310 permits the passage or escape of the combustion products from the second chamber 282, as signified by the arrows C. More specifically, the lid closure 285 will generally remain seated relative to sidewall shoulder portion 302 until sufficient internal pressure is developed within the second chamber 282 to overcome the interference fit between the lid closure and the gas generant cup.

It will be appreciated that in such an arrangement or combination in accordance with the invention, such a pop-off lid closure acts or functions as a one-way valve. In particular, such a pop-of lid closure provides or results in an arrangement or combination which desirably functions to avoid or prevent material, such as the combustion products formed upon the actuation of the first igniter device 262, to enter into the second chamber generant cup interior 296 but which also permits the desired passage of the combustion products formed upon the actuation of the second igniter device 290 to exit from the second chamber 282 and subsequently pass, as may be desired, into the first chamber 234 and subsequently through the filter assembly 240 and out the exit ports 224, shown in FIGS. 4 and 5.

Further, the lid closure 285 is desirably constructed of a sufficiently strong material to remain in tact, e.g., in significantly one-piece, even upon application of sufficient pressure thereagainst such as to result in the lid closure popping off or otherwise becoming dislodged from engagement with the gas generant cup. Those skilled in the art and guided by the teachings herein provided will appreciate that the thickness of lid closures useable in the practice of the invention can generally vary dependent on features such as the strength of the material of construction and the diameter of lid closure required to close the associated generant cup, for example. In practice, lid closures such as fabricated of A715 steel and having a thickness of about 2–3 mm have been found useful and effective in the general practice of the invention. More specifically, lid closures in accordance with the invention and as described above desirably advantageously provide or result in the maintenance of either and, preferably, both, a pressure and a thermal boundary between the respective gas generant material charges until such time that the particular charge is desired to be ignited. For example, the greater thickness of lid closures in accordance with the invention, as compared to typical or usual burst disks used in typical inflator devices, generally provides in significantly improved maintenance of a desired and effective thermal boundary between the respective gas generant material charges until such time that the particular charge is desired to be ignited.

A typical or expected actuation process for an inflator assembly in accordance with such an embodiment of the invention will now be described making specific reference to FIGS. 7–10. In particular, FIGS. 7–10 are simplified schematic cross sectional views of the airbag inflator 210 at selected points in time subsequent to actuation.

Figure 7:
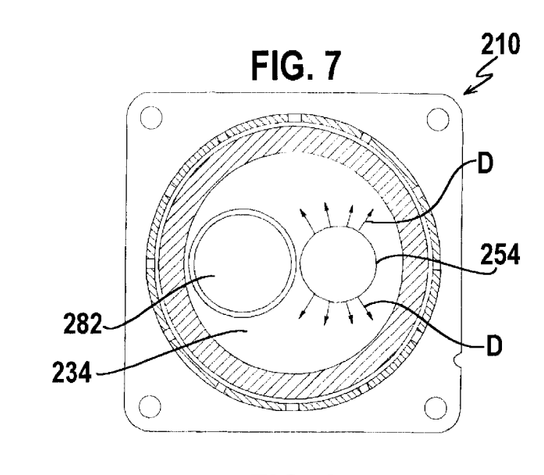
FIG. 7 illustrates the airbag inflator at a point in time of about 2 ms post-actuation.

More specifically, FIG. 7 illustrates the airbag inflator 210 at a point in time of about 2 ms post-actuation. As shown, actuation of the first igniter assembly 254 has resulted in the discharge of combustion products, signified by the arrows "D," from the first igniter assembly 254 and into the first chamber 234. As a result, the pressure within the first chamber 234, in accordance with one particular embodiment of the invention, is raised to a level of about 2000 psi. The second chamber lid closure, however, remains intact and the pressure within the second chamber 282 is generally unaffected by the pressure increase within the first chamber 234.

Figure 8:
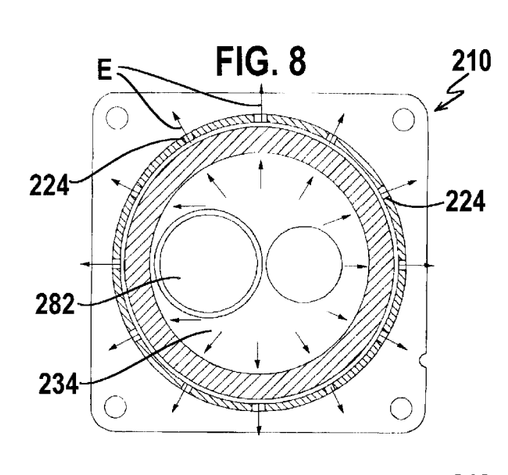
FIG. 8 illustrates the airbag inflator at a point in time of about 10 ms post-actuation.

FIG. 8 illustrates the airbag inflator 210 at a point in time of about 10 ms post-actuation. As shown, combustion products, signified by the arrows "E," are passing through the gas exits ports 224 and such as into an associated airbag cushion (not shown). At such point in the operation process, the pressure within the first chamber 234, in accordance with one embodiment of the invention, is raised to a level of about 3300 psi. The second chamber lid closure, however, remains intact and the pressure within the second chamber 282 is generally unaffected by the pressure increase within the first chamber 234.

Figure 9:
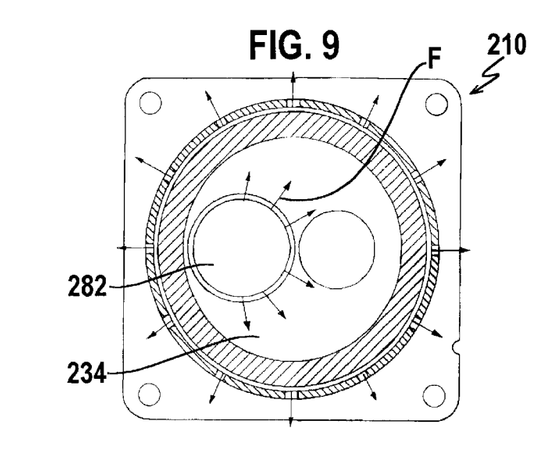
FIG. 9 illustrates the airbag inflator at a point in time of about 15 ms post-actuation.

FIG. 9 illustrates the airbag inflator 210 at a point in time of about 15 ms post-actuation. As shown, the second chamber lid closure has begun to open with combustion products signified by the arrows "F" beginning to flow from the second chamber 282 into the first chamber 234. At such point in the operation process, in accordance with one embodiment of the invention, the pressure within the first chamber 234 is about 3000 psi and the pressure within the second chamber 282 is sufficiently large enough to permit the passage of combustion products signified by the arrows F. Such opening of the lid closure can desirably occur when the pressure within the second chamber 282 exceeds the external pressure thereagainst, e.g., the pressure within the first chamber 234, by a selected or predetermined margin. In practice, lid closure opening pressure differentials of about 500 psi to about 600 psi have been found useful and effective in the practice of the invention.

Figure 10:
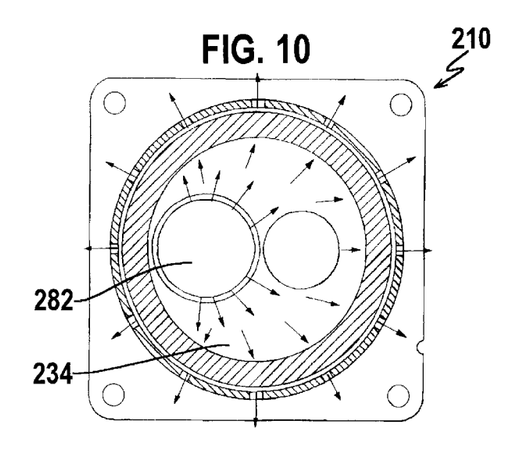
FIG. 10 illustrates the airbag inflator at a point in time of about 20 ms post-actuation.

FIG. 10 illustrates the airbag inflator 210 at a point in time of about 20 ms post-actuation. At such point in operation process, in accordance with one embodiment of the invention, the pressures within the first and second chambers, 234 and 282, respectively, have generally equalized at about 3000 psi.

Further, in accordance with a preferred practice of the invention, as the lid closure remains in tact upon opening, such a lid closure can desirably serve to facilitate radial flow of the combustion products out from the second chamber 282 and into the first chamber 234. For example, when both the first and second igniter devices are simultaneously actuated or fired, the ignition energy from the second chamber can desirably serve to accelerate combustion within the first chamber.

Thus, the invention provides an adaptive inflator device and corresponding operation in which two separate or distinct charges are desirably isolated until the respective desired actuation thereof and which subsequently permit the desired flow of the combustion products resulting from the combustion of each charge of each chamber into communication with the contents of the other chamber and ultimately to exit from the inflator. The invention further provides an adaptive inflator device of relatively simple design and construction and which, desirably, is of comparatively low or reduced cost. The invention in particular provides such an adaptive inflator device which will meet the size requirements for vehicles, especially for driver side applications.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An airbag inflator comprising:
    a housing defining a first chamber which in a static state contains a quantity of a first gas generant material ignitable to produce first combustion products including a first inflation gas, the first chamber also containing a second chamber which in a static state is closed and contains a quantity of a second gas generant material ignitable to produce second combustion products, the second chamber including a lid closure adapted to open to place the second combustion products in fluid communication with the contents of the first chamber;
    a first igniter device operatively associated with the first chamber; and
    a second igniter device operatively associated with the second chamber.

2. The airbag inflator of claim 1 wherein the second chamber includes a cup-shaped base having a shoulder portion with which, in the static state, the lid closure forms a press fit seated engagement whereby passage of the first combustion products into the second chamber is prevented.

3. The airbag inflator of claim 2 wherein the lid closure is adapted to open upon application thereagainst of a predetermined pressure from within the second chamber.

4. The airbag inflator of claim 3 wherein upon application of the predetermined pressure from within the second chamber against the lid closure, the lid is unseated from the shoulder portion forming a clearance space between the lid closure and the shoulder portion, whereby at least a portion of the second combustion products are placed in fluid communication with the contents of the first chamber outside of the second chamber.

5. The airbag inflator of claim 2 wherein the lid closure remains in tact upon application of predetermined opening pressure thereagainst.

6. The airbag inflator of claim 1 wherein the first gas generant material is a pyrotechnic material.

7. The airbag inflator of claim 6 wherein the second gas generant material is a pyrotechnic material.

8. The airbag inflator of claim 1 wherein the second gas generant material is a pyrotechnic material.

9. The airbag inflator of claim 1 having a form of a flattened, disk-shaped circular cylinder shaped and sized for driver side placement within a vehicle steering wheel.

10. The airbag inflator of claim 1 additionally comprising a single filter assembly for the filtration of inflation products of the first and second chambers.

11. The airbag inflator of claim 1 wherein the first and second gas generant materials differ in one or more of the following aspects: composition, shape, and size.

12. A method of generating inflation gas via an airbag inflator which includes:
    a housing defining a first chamber which in a static state contains a quantity of a first gas generant material ignitable to produce first combustion products including a first inflation gas, the first chamber having a plurality of spaced apart gas exit ports adapted to open to permit passage of the first inflation gas from the airbag inflator, the first chamber also containing a second chamber which in a static state is closed and contains a quantity of a second gas generant material ignitable to produce second combustion products including a second inflation gas, the second chamber including a lid closure adapted to open to place the second combustion products in fluid communication with the contents of the first chamber;
    a first igniter device operatively associated with the first chamber; and
    a second igniter device operatively associated with the second chamber;
    said method comprising the step of actuating at least one of the first and second igniter devices.

13. The method of claim 12 wherein the first igniter device is actuated prior to the second igniter device.

14. The method of claim 13 wherein prior to the actuation of the first igniter device, the lid closure forms a press fit seated engagement with a shoulder portion formed by a cup-shaped second chamber base and wherein subsequent to the actuation of the first igniter device, the lid closure remains in press fit seated engagement with the shoulder portion formed by the cup-shaped second chamber base.

15. The method of claim 14 additionally comprising the step of actuating the second igniter device subsequent to the actuating of the first igniter device.

16. The method of claim 15 wherein subsequent to the actuation of the second igniter device, sufficient internal pressure is developed within the second chamber to dislodge the lid closure from seated engagement with the shoulder portion formed by the cup-shaped second chamber base.

17. The method of claim 16 wherein the lid closure remains in tact after being dislodged.

* * * * *